(12) United States Patent  (10) Patent No.: US 9,387,749 B2
Katsura  (45) Date of Patent: Jul. 12, 2016

(54) SUNROOF APPARATUS (71) Applicant: AISIN SEIKI KABUSHIKI KAISHA, Kariya-shi, Aichi-ken (JP)

(72) Inventor: Shintaro Katsura, Novi, MI (US)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/802,489

(22) Filed: Jul. 17, 2015

(65) Prior Publication Data

US 2016/0031304 A1 Feb. 4, 2016

(30) Foreign Application Priority Data

Jul. 31, 2014 (JP) ................... 2014-156636

(51) Int. Cl.
*B60J 7/22* (2006.01)
*B60J 7/043* (2006.01)
*B60J 7/02* (2006.01)
*B60J 7/057* (2006.01)

(52) U.S. Cl.
CPC ............... *B60J 7/0435* (2013.01); *B60J 7/024* (2013.01); *B60J 7/057* (2013.01); *B60J 7/22* (2013.01)

(58) Field of Classification Search
CPC ...................................................... B60J 7/22
USPC ................ 296/217, 216.02–216.05
See application file for complete search history.

(56) References Cited

U.S. PATENT DOCUMENTS

| 4,684,168 | A | * | 8/1987 | Lupo | ........................ | B60J 7/22 |
| | | | | | | 296/217 |
| 5,031,959 | A | * | 7/1991 | Queveau | .................... | B60J 7/22 |
| | | | | | | 296/216.03 |
| 8,282,159 | B2 | | 10/2012 | Hirata et al. | | |
| 8,882,187 | B2 | | 11/2014 | Katsura et al. | | |
| 2010/0066130 | A1 | * | 3/2010 | Rashidy | ................... | B60J 7/022 |
| | | | | | | 296/216.08 |

FOREIGN PATENT DOCUMENTS

JP 2011-213338 10/2011

* cited by examiner

*Primary Examiner* — Dennis H Pedder
(74) *Attorney, Agent, or Firm* — Finnegan, Henderson, Farabow, Garrett & Dunner, LLP (57) ABSTRACT A sunroof apparatus includes: a movable panel that can open or close an opening formed in a roof of a vehicle; a deflector disposed along a front edge portion of the opening, and having arm portions extending rearward from both end portions of the deflector in a lateral direction, rear end portions of the arm portions being connected to the roof such that the deflector is turnable, and a biasing force is applied to the arm portions in a turning direction in which front ends pivotally move upward; guide rails disposed in both end portions of the opening in the lateral direction, and extending in a longitudinal direction; driving shoes provided to be able to move along the guide rails in the longitudinal direction; and support brackets, front end portions of which are supported by the guide rails.

9 Claims, 5 Drawing Sheets

INSIDE OF ⟵⟶ OUTSIDE
VEHICLE       OF VEHICLE
      LATERAL
      DIRECTION

FIG.7

SUNROOF APPARATUS

CROSS REFERENCE TO RELATED APPLICATIONS

This application is based on and claims priority under 35 U.S.C. §119 to Japanese Patent Application 2014-166636, filed on Jul. 31, 2014, the entire contents of which are incorporated herein by reference,

TECHNICAL FIELD

This disclosure relates to a sunroof apparatus.

BACKGROUND DISCUSSION

In the related art, JP 2011-213338A (paragraphs [0032]-[0033] and FIG. 1) (Reference 1) discloses a sunroof apparatus. This sunroof apparatus includes a movable panel which can open or close an opening formed in the roof of a vehicle, and a deflector that is disposed along a front edge portion of the opening. This sunroof apparatus further includes guide rails which are disposed in both end portions of the opening in a lateral direction of the vehicle, and extend in a longitudinal direction; driving shoes which can move along the guide rails in the longitudinal direction of the vehicle; and support brackets, front end portions of which are supported by the guide rails in such a manner that the support brackets can turn and move in the longitudinal direction of the vehicle, and which are connected to the driving shoes in a rear portion of the vehicle, and support the movable panel. Along with the movement of the driving shoes, in a fully closed state of the movable panel, when the support brackets pivotally turn relative to front end portions of the support brackets such that rear ends of the support brackets are raised, the movable panel is tilted upward, and when the front end portions of the support brackets continuously move toward the rear of the vehicle, the movable panel slides while being tilted upward.

The deflector has arm portions that extend rearward from both end portions of the deflector in the lateral direction of the vehicle, and when the arm portions turn in such a manner that front ends of the arm portions pivotally move upward relative to rear end portions thereof, the deflector protrudes further upward than the upper surface of the roof in a vertical direction of the vehicle. A biasing member biases the arm portions in a turning direction in which the front ends of the arm portions pivotally move upward relative to the rear end portions.

In contrast, an engaging pin protrudes from the front end portion of each of the support brackets in the lateral direction of the vehicle. For example, when the movable panel is in a fully closed state, the engaging pin presses the arm portion downward in the vertical direction of the vehicle, and thus while counteracting the biasing force of the biasing member, the engaging pin holds the arm portion at a turning position in which the front end of the arm portion pivotally moves downward relative to the rear end portion thereof. When the support brackets slide along the guide rails toward the rear of the vehicle such that the movable panel is opened, the engaging pins release the arm portions. Accordingly, the deflector, the arm portions of which are biased by the biasing member as described above, protrudes further upward than the upper surface of the roof in the vertical direction of the vehicle.

In the sunroof apparatus disclosed in Reference 1, it is necessary to separately provide the engaging pin that presses the arm portion, and thus the number of components is increased.

SUMMARY

Thus, a need exists for a sunroof apparatus which is not suspectable to the drawback mentioned above.

A sunroof apparatus according to an aspect of this disclosure includes: a movable panel that can open or close an opening formed in a roof of a vehicle; a deflector which is disposed along a front edge portion of the opening, and has arm portions that extend rearward from both end portions of the deflector in a lateral direction of the vehicle, and in which rear end portions of the arm portions are connected to the roof in such a manner that the deflector is turnable, and a biasing force is applied to the arm portions in a turning direction in which front ends pivotally move upward relative to the rear end portions; guide rails that are disposed in both end portions of the opening in the lateral direction of the vehicle, and extend in a longitudinal direction; driving shoes which are provided so as to be able to move along the guide rails in the longitudinal direction of the vehicle; and support brackets, front end portions of which are supported by the guide rails in such a manner that the support brackets can turn and move in the longitudinal direction of the vehicle, and which are connected to the driving shoes at a rear portion thereof in the longitudinal direction of the vehicle, and support the movable panel, in which along with the movement of the driving shoe in a fully closed state of the movable panel, when the support bracket turns in such a manner that a rear end of the support bracket pivotally moves upward relative to a front end portion of the support bracket, the movable panel is tilted upward, and subsequently, when the front end portion moves toward the rear of the vehicle, the movable panel slides along the guide rails while being tilted upward, and in which a first engaging portion is formed integrally with the driving shoe, and the first engaging portion presses the arm portion downward in a vertical direction of the vehicle in the fully closed state of the movable panel, and thereby holds the arm portion at a turning position in which the front end of the arm portion pivotally moves downward relative to the rear end portion because.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a sunroof apparatus will be described. In the following description, a "longitudinal direction" refers to a longitudinal direction of a vehicle, and an "upper side" and a "lower side" refer to the upper side and the lower side of the vehicle in a vertical direction of the vehicle, respectively. An inside, facing a vehicle's passenger compartment, in a lateral direction of the vehicle refers to the "inside of the vehicle", and an outside, facing the outside of the vehicle's passenger compartment, in the lateral direction of the vehicle refers to the "outside of the vehicle".

Figure 1:
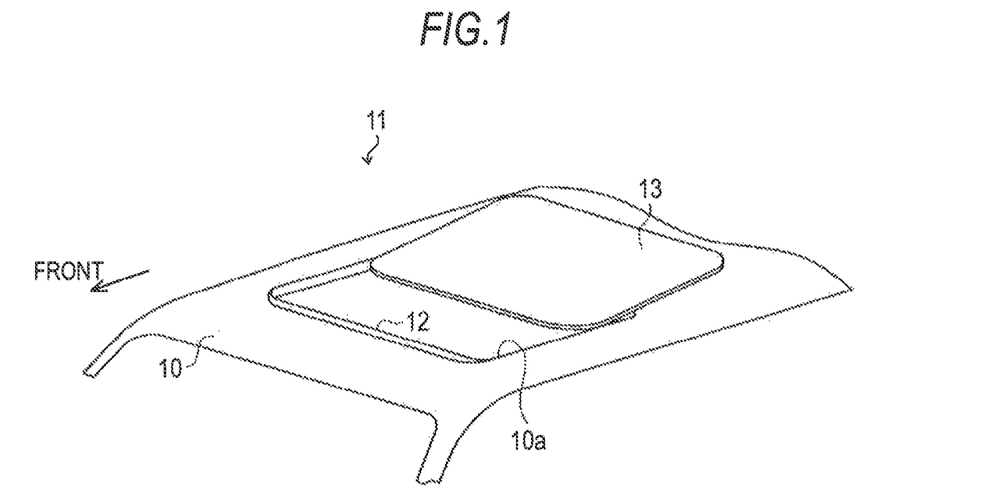
FIG. 1 is a perspective view when a roof is obliquely seen from the top.

As illustrated in FIG. 1, a substantially rectangular opening 10a is formed in a roof 10 of a vehicle such as an automobile, and a sunroof apparatus 11 is mounted on the roof 10. The sunroof apparatus 11 includes a deflector 12 which extends in the lateral direction of the vehicle, and is disposed along a front end portion of the opening 10a, and a substantially rectangular movable panel 13 made of a glass plate or the like, which moves in the longitudinal direction to open or close the opening 10a.

The deflector 12 is attached in such a manner that the deflector 12 can be tilted upward, that is, in a such manner that a front portion of the deflector 12 can pivotally move upward relative to a rear portion of the deflector 12. When the movable panel 13 is opened, the deflector 12 is tilted upward, and protrudes further upward than the upper surface of the roof 10 (deployed state). In contrast, when the movable panel 13 is closed, the deflector 12 is stored below the upper surface of the roof 10 (stored state). Since the deflector 12 is deployed when the opening 10a is opened, the entrainment of wind into a vehicle's passenger compartment is prevented from causing the occurrence of aerial vibration.

The movable panel 13 is attached in such a manner that a rear portion of the movable panel 13 can be pivotally tilted upward relative to a front portion of the movable panel 13, and the movable panel 13 can slide in the longitudinal direction. The movable panel 13 opens and closes the opening 10a using a so-called outer sliding method in which the movable panel 13 slides while being tilted upward.

Subsequently, the structure of the sunroof apparatus 11 is described in conjunction with an opening and closing operation performed by the movable panel 13.

Figure 2:
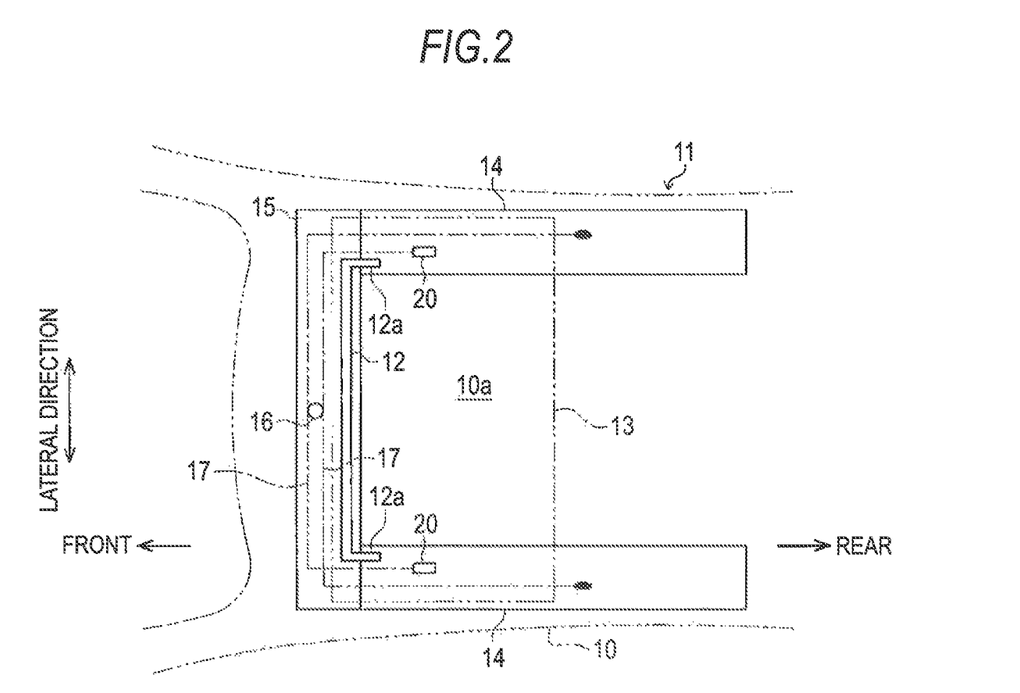
FIG. 2 is a plan view illustrating an embodiment.

As illustrated in FIG. 2, a pair of guide rails 14 is provided in both edge portions of the opening 10a in the lateral direction of the vehicle. For example, the guide rail 14 is made of an extruded aluminum alloy material, and the guide rail 14 with a uniform longitudinal section extends in the longitudinal direction. Front ends of both the guide rails 14 are connected to each other via a front housing 15 that extends in the lateral direction of the vehicle.

Both end portions of the deflector 12 in a longitudinal direction thereof are respectively connected to front end portions of both guide rails 14, with the front end portions being disposed the inside of the vehicle. That is, the deflector 12 has arm portions 12a which extend rearward from both end portions of the deflector 12 in the lateral direction of the vehicle, and rear end portions of the arm portions 12a are connected to the guide rails 14 in such a manner that the deflector 12 can turn around an axial line extending in the lateral direction of the vehicle. The biasing force of an adequate biasing member (for example, a coil spring or a leaf spring: not illustrated) is applied to the arm portions 12a in a turning direction in which front ends pivotally move upward relative to the rear end portions, that is, a biasing force deploying the deflector 12 is applied. In other words, while counteracting a biasing force, the arm portions 12a turn such that the front ends pivotally move downward relative to the rear end portions, and as a result, the deflector 12 is in a stored state.

Both the guide rails 14 guide and support a pair of functional components 20 outside of the deflector 12 in the lateral direction of the vehicle in such a manner that the functional component 20 can move in the longitudinal direction. The movable panel 13 is connected to and is supported by both the functional components 20 while being suspended therebetween. When both the functional components 20 move along the guide rails 14 in the longitudinal direction, the movable panel 13 is tilted upward or slides along the guide rails 14.

An electric driving source 16 such as a motor with an output gear is installed in a longitudinal intermediate portion of the front housing 15. The electric driving source 16 is connected to both the functional components 20 via a pair of substantially belt-like driving belts 17 made of a resin material or the like, and simultaneously moves both the functional components 20 in the longitudinal direction.

Figure 3:
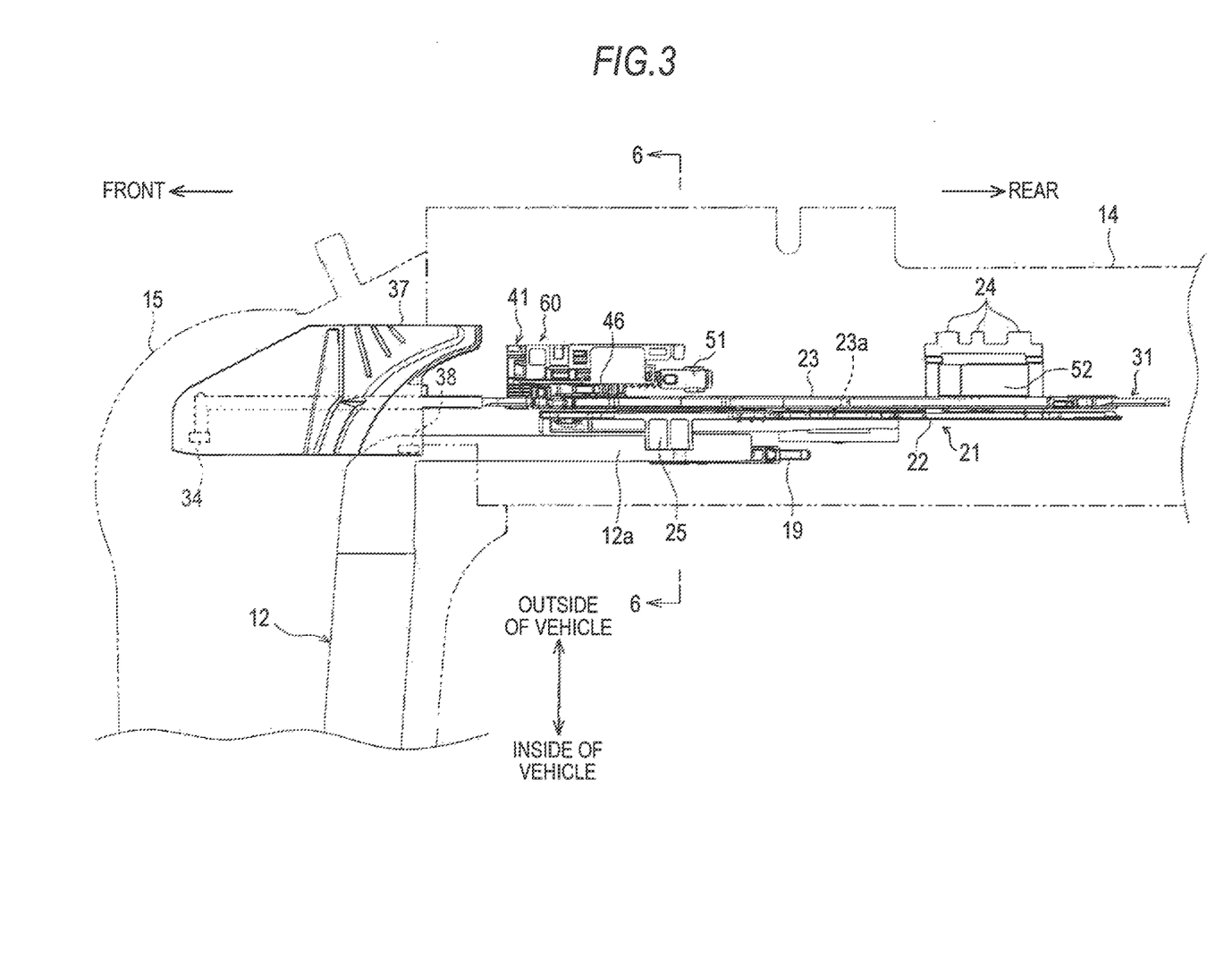
FIG. 3 is a plan view illustrating the embodiment.
Figure 6:
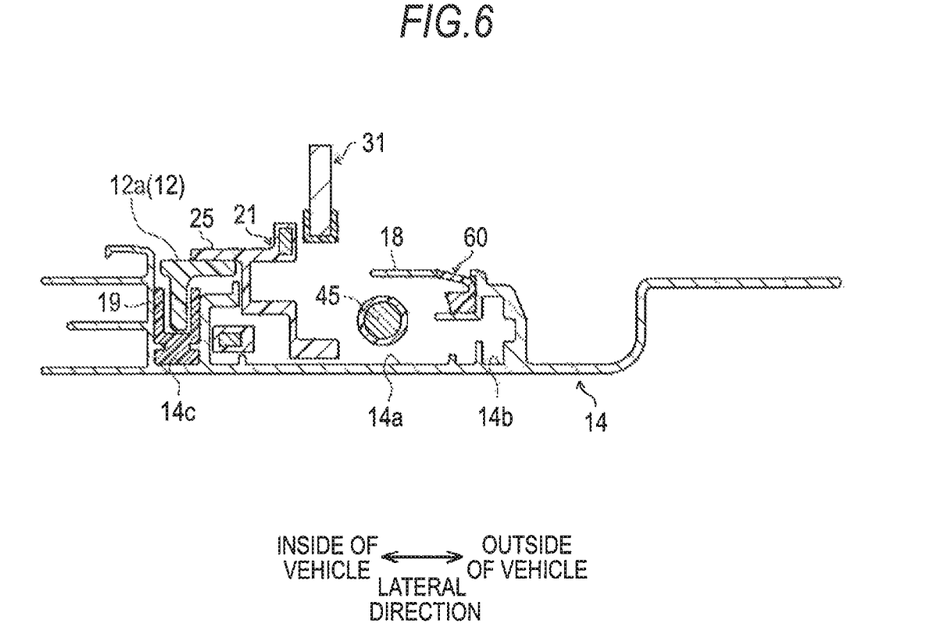
FIG. 6 is a sectional view taken along line 6-6 in FIG. 3.

As illustrated in FIG. 3, a base member 19 made of a resin material or the like is mounted in the front end portion of each of the guide rails 14, with the front end portion being disposed the inside of the vehicle. That is, as illustrated in FIG. 6, each of the guide rails 14 includes a first rail portion 14a which is formed in a substantially U-shaped section, and opens upward; a second rail portion 14b which is formed adjacent to a lateral outside portion of the first rail portion 14a; and a holding portion 14c which is formed in a substantially U-shaped section, and opens upward while being adjacent to a lateral inside portion of the first rail portion 14a. The base member 19 is mounted on the holding portion 14c in such a manner that the base member 19 cannot move relative to the guide rail 14 in the longitudinal direction. The base member 19 has a substantially U-shaped section which opens upward, and, with the rear end portion of the arm portion 12a interposed between the base member 19 in the lateral direction of the vehicle, the base member 19 supports the rear end portion of the arm portion 12a in such a manner that the rear end portion of the arm portion 12a is turnable. That is, the rear end portion of the arm portion 12a is connected to the guide rail 14 (the roof 10) via the base member 19 in such a manner that the rear end portion of the arm portion 12a is turnable. The second rail portion 14b along with a side wall of the first rail portion 14a forms a substantially T-shaped section, and the second rail portion 14b communicates with the first rail portion 14a via an opening formed in the side wall. A flange-shaped guide portion 18 is formed above a lateral outside portion of the first rail portion 14a of each of the guide rails 14.

Figure 4:
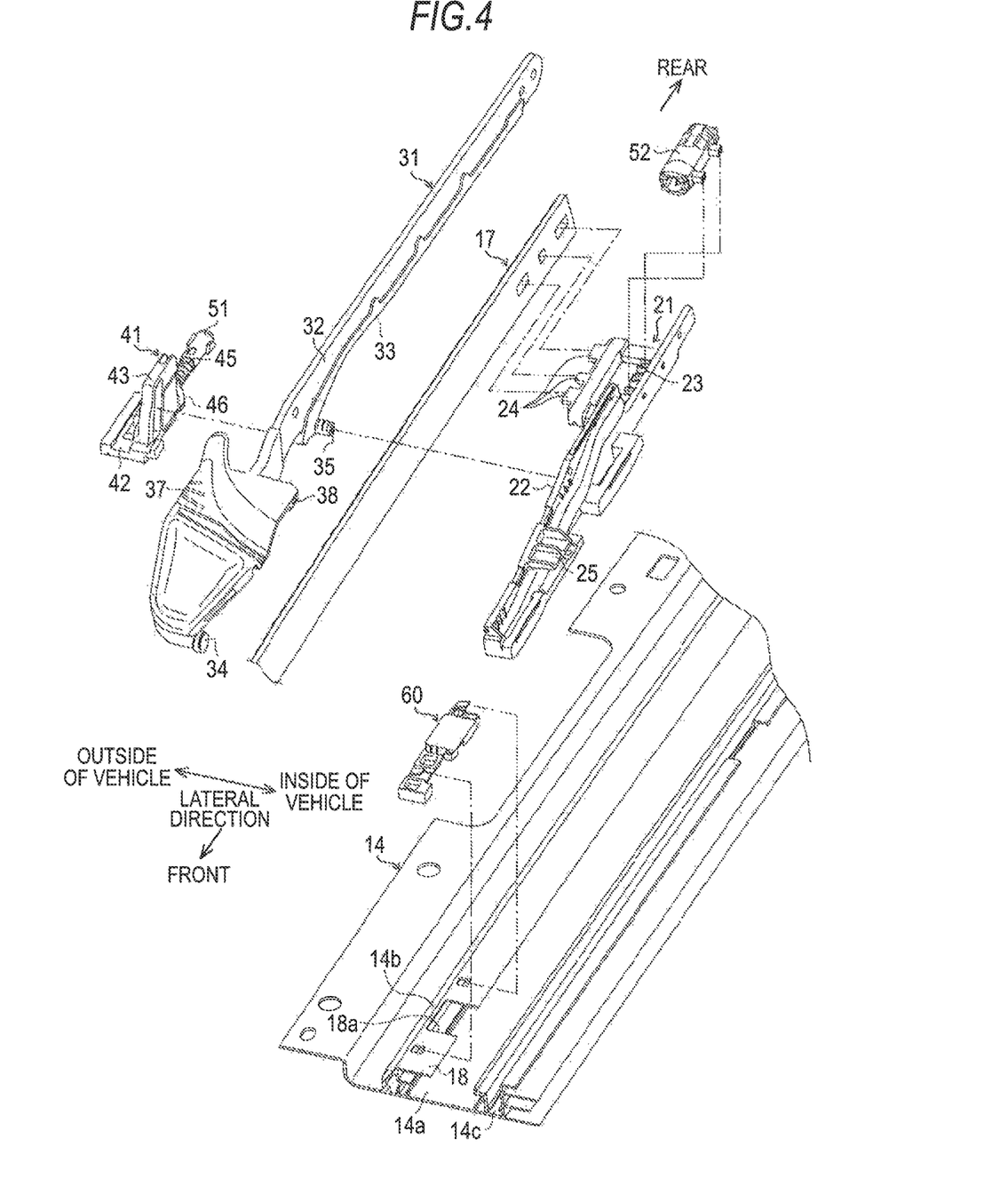
FIG. 4 is an exploded perspective view illustrating the embodiment.

As illustrated in FIG. 4, the guide portion 18 includes a substantially rectangular cut-out portion 18a formed at a predetermined position close to the front of the vehicle. A guide block 60 is fixed to the guide rail 14 in such a manner that the guide block 60 is placed on the lateral outside portion of the first rail portion 14a, and is fitted into the cut-out portion 18a of the guide portion 18.

A driving shoe 21 is mounted on the guide rail 14 (the first rail portion 14a) in such a manner as to be able to move in the longitudinal direction, and is a member in which metal plates, resin, and the like are integrated together. The driving shoe 21 includes a vertical wall portion 22 which is erected over the substantial entire longitudinal length of the driving shoe 21, and a protruding wall portion 23 which protrudes a substantially predetermined distance toward the outside of the vehicle from a lower end portion of the vertical wall portion 22 over the substantial entire longitudinal length thereof. The driving shoe 21 includes a plurality (three) of extending pieces 24 which enter a second rail portion 14b positioned outside of the vehicle. The extending pieces 24 are connected to the driving belt 17 that slides along the second rail portion 14b in the longitudinal direction. When the electric driving source 16 moves the driving belt 17 along the guide rail 14 (the second rail portion 14b) in the longitudinal direction, the driving shoe 21 moves along the first rail portion 14a in the longitudinal direction.

Figure 5A:
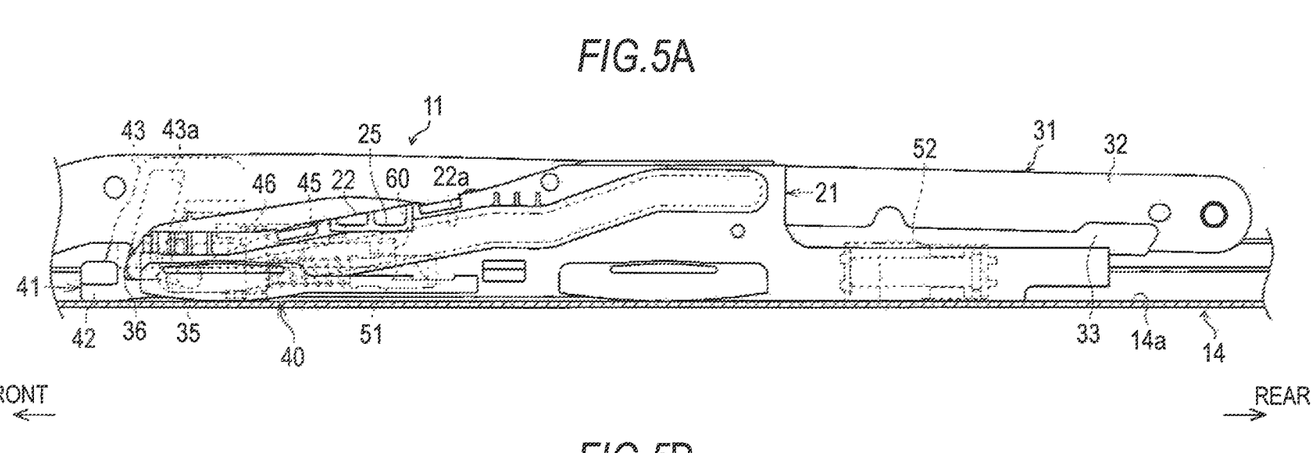
FIG. 5A is a side view illustrating a fully closed state of a movable panel.
Figure 5B:
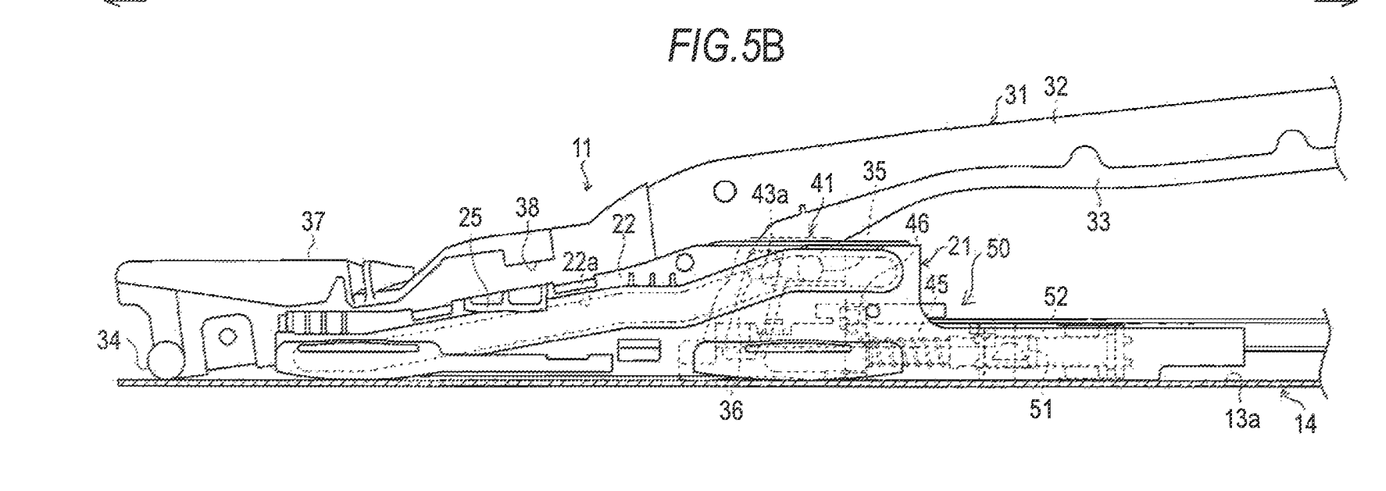
FIG. 5B is a side view of a second tilted up state of the movable panel.
Figure 7:
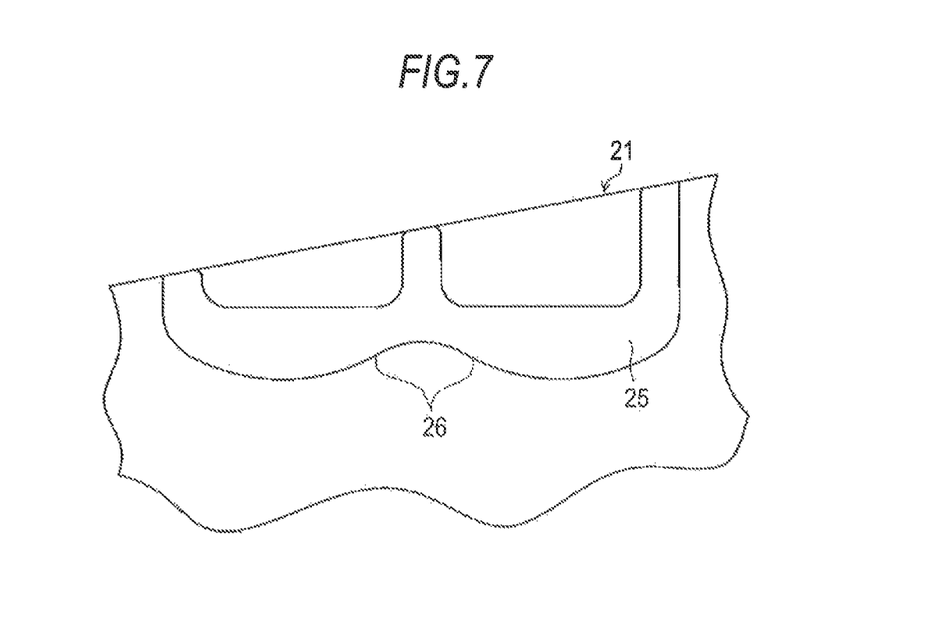
FIG. 7 is an enlarged side view of the embodiment.

As illustrated in FIGS. 5A and 5B, the vertical wall portion 22 includes a guide groove 22a which is concave toward the inside of the vehicle from the lateral external end surface of the vertical wall portion 22, and extends in the longitudinal direction. Basically, the guide groove 22a is inclined upward toward the rear of the vehicle. A first engaging portion 25 is formed integrally with the vertical wall portion 22, and is an engaging portion that protrudes toward the inside of the vehicle (front side perpendicular to the sheet of FIGS. 5A and 5B) above a longitudinal intermediate portion of the guide groove 22a. The first engaging portion 25 has a substantially flat plate shape which extends in parallel with a bottom wall of the guide rail 14, and as largely illustrated in FIG. 7, substantially semi-cylindrical ribs 26 are formed on the lower surface of the first engaging portion 25 in such a manner that the ribs 26 line up in the longitudinal direction, and protrude downward. Each of the ribs 26 has a substantially uniform section, and extends in the lateral direction of the vehicle. As illustrated in FIG. 3, an engageable insertion concave portion 23a is formed in a longitudinal intermediate portion of the protruding wall portion 23, and the engageable insertion concave portion 23a is concave toward the inside of the vehicle from the lateral external end surface of the protruding wall portion 23.

As illustrated in FIG. 4, support brackets 31 extending in the longitudinal direction are fixedly attached to edge portions of the lower surface of the movable panel 13 in the lateral direction of the vehicle. The support bracket 31 extends over the substantial entire length of the movable panel 13, and includes a vertical wall portion 32 made of a metal plate which is perpendicularly provided on the lower surface of the movable panel 13, and a molding portion 33 made of resin in which a lower edge portion of the vertical wall portion 32 is mainly buried.

Basically, the support bracket 31 is disposed on the protruding wall portion 23 of the driving shoe 21, and outside of the vertical wall portion 22 in the lateral direction. A substantially circular column-shaped driven shoe 34 is formed at a front end of the support bracket 31. The driven shoe 34 is mounted in front of the driving shoe 21 in the vehicle in such a manner that the driven shoe 34 can move relative to the first rail portion 14a of the guide rail 14 in the longitudinal direction. When the support brackets 31 pivotally turn relative to front portions (the driven shoes 34) of the support brackets 31 such that rear portions of the support brackets 31 are raised, the movable panel 13 is tilted upward, and when the support brackets 31 pivotally turn relative to the front portions such that the rear portions are lowered, the movable panel 13 is tilted downward. The functional component 20 is made up of the driving shoe 21 and the driven shoe 34.

As illustrated in FIG. 5A, a substantially circular column-shaped elevating guide pin 35 is provided integrally with a front end portion of the molding portion 33, protrudes toward the inside of the vehicle, and is movably inserted into the guide groove 22a. The elevating guide pin 35 is set to be disposed at a lower end of the guide groove 22a when the movable panel 13 is fully closed. Accordingly, in this state, when the driving shoe 21 moves a predetermined distance relative to the support bracket 31 toward the front of the vehicle, the elevating guide pin 35 moves upward along the guide groove 22a, and reaches an intermediate portion of the guide groove 22a. At this time, the support brackets 31 pivotally turn relative to the front portions such that the rear portions are raised, and thus the movable panel 13 is tilted upward (first tilted up state).

Subsequently, when the driving shoe 21 moves further toward the front of the vehicle, as illustrated in FIG. 5B, the elevating guide pin 35 moves further upward along the guide groove 22a, and reaches a dead end of the guide groove 22a.

At this time, when the support brackets 31 pivotally turn more relative to the front portions such that the rear portions are further raised, the movable panel 13 is tilted further upward (second tilted up state).

A substantially long circular column-shaped locking pin 36, which extends toward the outside of the vehicle, is provided integrally with a front end portion of the molding portion 33 positioned further in front of the elevating guide pin 35 in the vehicle. As illustrated in FIG. 4, a substantially tray-like drain portion 37 made of resin is provided integrally with a front upper end portion of the vertical wall portion 32 positioned further in front of the locking pin 36 in the vehicle, and the drain portion 37 protrudes from the vertical wall portion 32 toward the inside and the outside of the vehicle. The drain portion 37 guides and drains water (for example, rain) falling from the movable panel 13 to an adequate drain groove connected to the outside. A second engaging portion 38 with a substantially rectangular column shape is formed integrally with a rear end (positioned inside of the vehicle) of the drain portion 37, and protrudes downward. When the movable panel 13 is fully closed, the second engaging portion 38 is disposed in front of the first engaging portion 25 in the vehicle while being substantially parallel to the bottom wall of the guide rail 14.

While being adjacent to a lateral external portion of the support bracket 31, a slide check 41 made of resin is mounted on the guide rail 14 (the first rail portion 14a) in such a manner that the slide check 41 can move in the longitudinal direction. That is, the slide check 41 includes a shoe portion 42 which slides against a lateral external portion of the first rail portion 14a, and a vertical wall portion 43 which is erected upright between the support bracket 31 and the guide portion 18 in the lateral direction of the vehicle. When the shoe portion 42 slides against the lateral external portion of the first rail portion 14a, the slide check 41 can move along the guide rail 14 in the longitudinal direction.

As illustrated in FIGS. 5A and 5B, a long allowable hole 43a is formed in a front end portion of the vertical wall portion 43, and the locking pin 36 is movably inserted into the allowable hole 43a. The allowable hole 43a is straight inclined upward toward the rear of the vehicle. That is, the slide check 41 is connected to the support bracket 31 via the locking pin 36 inserted into the allowable hole 43a. When the locking pin 36 freely runs along the allowable hole 43a, the slide check 41 allows the movable panel 13 to be tilted (tilted upward or downward). The slide check 41 restricts the locking pin 36 (the support bracket 31) from moving in the allowable hole 43a in the longitudinal direction. Accordingly, when the slide check 41 moves in the longitudinal direction, the slide check 41 moves (slides) integrally with the movable panel 13 in the longitudinal direction, the movable panel 13 being supported by the support bracket 31.

The slide check 41 includes a substantially circular column-shaped support shaft 45, the center line of which extends in the longitudinal direction, and which is non-turnable and protrudes toward the rear of the vehicle. A substantially annular rotating check 46 is supported by a front end portion of the support shaft 45 while being adjacent to the slide check 41. The rotating check 46 along with the slide check 41, the guide block 60, and the like forms a well-known check mechanism 40. For example, when the driving shoe 21 moves toward the front of the vehicle in the fully closed state of the movable panel 13, the longitudinal movement of the rotating check 46 is restricted due to engagement between the rotating check 46 and the guide block 60, and the turning of the rotating check 46 is restricted due to engagement between the rotating check 46 and the driving shoe 21. Accordingly, the longitudinal movement of the rotating check 46 and the slide check 41 is restricted, and the longitudinal movement of the support bracket 31 is also restricted, the support bracket 31 being connected to the slide check 41 via the allowable hole 43a and the like. As a result, the movable panel 13 is allowed to transition only from the fully closed state to the tilted up state.

When the engageable insertion concave portion 23a reaches the rotating check 46 as the driving shoe 21 moves toward the front of the vehicle, the restriction of turning by the driving shoe 21 is released. In this state, when the driving shoe 21 and the rotating check 46 move toward the rear of the vehicle, the rotating check 46 turns while being guided by the guide block 60, and thus the engagement between the rotating check 46 and the guide block 60 is released, and the turning of the rotating check 46 is re-restricted due to engagement between the rotating check 46 and the guide rail 14 (guide portion 18). Accordingly, the restriction of the longitudinal movement of the rotating check 46 and the slide check 41 is released, and the restriction of the longitudinal movement of the support bracket 31 is also released, the support bracket 31 being connected to the slide check 41 via the allowable hole 43a and the like. At this time, a portion of the rotating check 46 is disposed on a longitudinal movement track on the inside wall surface of the engageable insertion concave portion 23a.

A rotating cam 51 made of resin is supported by a rear end portion of the support shaft 45. in contrast, the driving shoe 21 includes a fixed cam 52 made of resin that is installed coaxially with the rotating cam 51 at the rear (behind the rotating cam 51) of the vehicle. The fixed cam 52 is separated from the rotating cam 51 when the driving shoe 21 is present at a position in which the movable panel 13 transitions at least from the fully closed state to the first tilted up state. The fixed cam 52 overlaps the rotating cam 51 in the longitudinal direction when the driving shoe 21 is present at a position in which the movable panel 13 transitions to the second tilted up state. The rotating cam 51 and the fixed cam 52 form a well-known engaging and disengaging switch mechanism 50. The engaging and disengaging switch mechanism 50 switches a disengaged state of the rotating cam 51 and the fixed cam 52 to an engaged state, or switches an engaged state of the rotating cam 51 and the fixed cam 52 to a disengaged state, using a pressing operation between the rotating cam 51 and the fixed cam 52.

In this configuration, for example, in the fully closed state of the movable panel 13, when the driving shoe 21 moves the predetermined distance relative to the support bracket 31, the locking pin 36 freely runs along the allowable hole 43a while moving upward along the allowable hole 43a of the slide check 41, and the elevating guide pin 35 moves upward along the guide groove 22a and reaches the intermediate portion of the guide groove 22e. Accordingly, the movable panel 13 transitions to the first tilted up state.

As described above, when the driving shoe 21 is present at the position in which the movable panel 13 transitions at least from the fully closed state to the first tilted up state, the rotating cam 51 and the fixed cam 52 of the engaging and disengaging switch mechanism 50 are separated from each other in the longitudinal direction (disengaged state of the rotating cam 51 and the fixed cam 52). Accordingly, when the driving shoe 21 moves to the rear of the vehicle in the first tilted up state of the movable panel 13, the locking pin 36 freely runs along the allowable hole 43a while moving downward along the allowable hole 43a of the slide check 41, and the elevating guide pin 35 moves downward along the guide groove 22a and reaches a dead end of the guide groove 22a. As a result, the movable panel 13 is tilted downward such that the rear end portions of the support brackets 31 pivotally move downward relative to the front portions, and the movable panel 13 transitions to the fully closed state.

In contrast, when the driving shoe 21 moves further toward the front of the vehicle relative to the support bracket 31 in the first tilted up state of the movable panel 13, the locking pin 36 freely runs along the allowable hole 43a while moving further upward along the allowable hole 43a of the slide check 41, and the elevating guide pin 35 moves upward along the guide groove 22a and reaches the dead end of the guide groove 22a. Accordingly, the movable panel 13 transitions to the second tilted up state. When the engageable insertion concave portion 23a reaches the rotating check 46 along with the movement of the driving shoe 21 toward the front of the vehicle, the rotating check 46 is allowed to turn.

At this time, as described above, the rotating cam 51 and the fixed cam 52 of the engaging and disengaging switch mechanism 50 overlap each other in the longitudinal direction. Thereafter, when the driving shoe 21 along with the fixed cam 52 moves toward the rear of the vehicle, the rotating cam 51 is engaged with the fixed cam 52 due to the pressing operation therebetween, and the slide check 41 and the rotating check 46 along with the rotating cam 51 move toward the rear of the vehicle being like an integrated element. The rotating check 46 (allowed to turn) turns in the engageable insertion concave portion 23a while being guided by the guide block 60, engagement between the rotating check 46 and the guide block 60 is released, and the turning of the rotating check 46 is re-restricted due to engagement between the rotating check 46 and the guide rail 14 (the guide portion 18). Accordingly, the restriction of the movement of the slide check 41 toward the rear of the vehicle is released, and the restriction of the movement of the support bracket 31 toward the rear of the vehicle is also released, the support bracket 31 being connected to the slide check 41 via the allowable hole 43a and the like. At the same time, a portion of the rotating check 46 enters the engageable insertion concave portion 23a, and is disposed on the longitudinal movement track on the inside wall surface of the engageable insertion concave portion 23a.

Accordingly, when the driving shoe 21 moves toward the rear of the vehicle being like an integrated element, the slide check 41 along with the support bracket 31 and the rotating check 46 moves toward the rear of the vehicle via the rotating cam 51 and the fixed cam 52 which are engaged together. At this time, the movable panel 13 supported by the support brackets 31 moves toward the rear of the vehicle while being in the second tilted up state, and the opening 10a is opened. Accordingly, the movable panel 13 is in an open state.

When the movable panel 13 is in the open state, as described above, the rotating check 46 is engaged with the guide rail 14 (the guide portion 18), and the turning of the rotating check 46 is restricted. A portion of the rotating check 46 is disposed on the longitudinal movement track on the inside wall surface of the engageable insertion concave portion 23a. Accordingly, in this state, when the driving shoe 21 moves toward the front of the vehicle, the inside wall surface of the engageable insertion concave portion 23a presses the rotating check 46, and thus the rotating check 46 along with the slide check 41 and the support bracket 31 moves toward the front of the vehicle being like an integrated element. At this time, the movable panel 13 supported by the support brackets 31 moves toward the front of the vehicle while being in the second tilted up state, and the opening 10a is closed.

When the movable panel 13 approaches an original state before transitioning to the second tilted up state, due to the closing operation of the movable panel 13, the rotating check 46 turns while being guided by the guide block 60, and is engaged with the guide block 60 and the driving shoe 21, and thus the turning of the rotating check 46 is re-restricted. Accordingly, the longitudinal movement of the rotating check 46 along with the slide check 41 and the support bracket 31 is restricted.

When the driving shoe 21 moves further toward the front of the vehicle in this state, the fixed cam 52 moves further toward the front of the vehicle relative to the rotating cam 51 that is restricted from moving in the longitudinal direction along with the slide check 41. Thereafter, when the driving shoe 21 moves toward the rear of the vehicle, the rotating cam 51 is disengaged from the fixed cam 52 due to the pressing operation therebetween, and the driving shoe 21 along with the fixed cam 52 moves toward the rear of the vehicle while the rotating check 46, the slide check 41, and the rotating cam 51 are left behind.

At this time, the locking pin 36 freely runs along the allowable hole 43a while moving downward along the allowable hole 43a of the slide check 41, and the elevating guide pin 35 moves downward along the guide groove 22a, and reaches the dead end of the guide groove 22a. As a result, the movable panel 13 is tilted downward, and transitions to a fully closed state via the first tilted up state.

Subsequently, an operation of the embodiment is described.

As illustrated in FIG. 3, when the movable panel 13 is fully closed, the first engaging portion 25 of the driving shoe 21 is held at a turning position in which the front end of the arm portion 12a pivotally moves downward relative to the rear end portion (turning axis) because the first engaging portion 25 is positioned above a longitudinal intermediate portion of the arm portion 12a, and presses the arm portion 12a downward. At this time, the second engaging portion 38 of the support bracket 31 is positioned above the front end portion of the arm portion 12a, and the second engaging portion 38 along with the first engaging portion 25 presses the arm portion 12a downward. As such, when the movable panel 13 is fully closed, the arm portion 12a is more stably pressed downward by the first engaging portion 25 and the second engaging portion 38 which are separated from each other in the longitudinal direction.

When the driving shoe 21 moves toward the front of the vehicle such that the movable panel 13 transitions to the first tilted up state, along with a tilting upward operation of the movable panel 13, the second engaging portion 38 moves away upward from the arm portion 12a, and the first engaging portion 25 moves toward the front of the vehicle along the arm portion 12a. Accordingly, as described above, when the transition of the movable panel 13 to the first tilted up state is completed, the driving shoe 21 is positioned relatively close to the front of the vehicle, and the first engaging portion 25 is disposed relatively separate from the turning axis (the rear end portion) of the arm portion 12a. For this reason, the first engaging portion 25 can more stably press the arm portion 12a downward. The second engaging portion 38 is positioned in front of the first engaging portion 25 in the vehicle; however, as described above, even if the driving shoe 21 moves further toward the front of the vehicle such that the movable panel 13 transitions to the second tilted up state, the first engaging portion 25 is set in such a manner as not to interfere with the second engaging portion 38.

In contrast, when the driving shoe 21 moves toward the rear of the vehicle such that the movable panel 13 is opened while being in the second tilted up state, the first engaging portion 25 moves toward the rear of the vehicle along the arm portion 12a, and eventually passes the arm portion 12a. At this time, the aforementioned biasing force causes the turning of the arm portion 12a, released from the first engaging portion 25, such that the front end pivotally moves upward relative to the rear end portion. The arm portion 12a comes into contact with the second engaging portion 38 of the support bracket 31, and further turns after the second engaging portion 38 passes by the arm portion 12a. As a result, the deflector 12 transitions to the deployed state.

Thereafter, when the driving shoe 21 moves toward the front of the vehicle such that the movable panel 13 is closed while being in the second tilted up state, the second engaging portion 38 of the support bracket 31 reaches the arm portion 12a, and presses the arm portion 12a downward, and the first engaging portion 25 reaches the arm portion 12a, and presses the arm portion 12a downward. Accordingly, the arm portion 12a is held at the turning position in which the front end of the arm portion 12a pivotally moves downward relative to the rear end portion thereof. As a result, the deflector 12 transitions to the stored state. That is, while counteracting the aforementioned biasing force, the first engaging portion 25 and the like press the arm portion 12a downward such that the deflector 12 is stored when the movable panel 13 is closed.

In contrast, when the driving shoe 21 moves toward the rear of the vehicle such that the movable panel 13 transitions to the fully closed state, along with a tilting downward operation of the movable panel 13, the second engaging portion 38 approaches and presses the arm portion 12a downward, and the first engaging portion 25 moves toward the rear of the vehicle along the arm portion 12a.

As described above in detail, in the embodiment, it is possible to obtain the following effects.

(1) In the embodiment, since the first engaging portion 25 for controlling the position of the arm portion 12a (the deflector 12) is formed integrally with the driving shoe 21 it is possible to reduce the number of components and manufacturing man hours without an engaging pin or an attachment step being added unlike a configuration in the related art. In addition, it is possible to reduce costs.

(2) In the embodiment, when the movable panel 13 transitions from the fully closed state to the tilted up state (the second tilted up state), the driving shoe 21 moves toward the front of the vehicle relative to the support bracket 31. Accordingly, when the transition of the movable panel 13 to the tilted up state is completed, the driving shoe 21 is positioned relatively close to the front of the vehicle, and the first engaging portion 25 is disposed relatively separate from the turning axis (the rear end portion) of the arm portion 12a. For this reason, the first engaging portion 25 can more stably press the arm portion 12a downward, Since the first engaging portion 25 can be disposed separate from the turning axis (the rear end portion) of the arm portion 12, it is possible to further reduce the required longitudinal dimension of the driving shoe 21 including the first engaging portion 25.

(3) In the embodiment, since the driving shoe 21 is disposed adjacent to a lateral outside portion of the arm portion 12e. it is possible to easily press the arm portion 12a without considerably extending the first engaging portion 25 in the lateral direction of the vehicle. In addition, the first engaging portion 25 can press the arm portion 12a without interfering with the surrounding components disposed in the lateral direction of the vehicle, and it is possible to simplify the shape of the first engaging portion 25 more.

(4) In the embodiment, since the pair of ribs 26 comes into point contact or line contact with the arm portion 12a when the first engaging portion 25 presses the arm portion 12a downward, a pressing force can be concentrated on the arm portion 12a, and it is possible to prevent the occurrence of backlash of the arm portion 12a.

(5) In the embodiment, when the movable panel 13 is fully closed, the driving shoe 21 is positioned relatively close to the rear of the vehicle, and the first engaging portion 25 of the driving shoe 21 is disposed relatively close to the turning axis (the rear end portion) of the arm portion 12a. For this reason, the first engaging portion 25 may unstably press the arm portion 12a downward. However, the second engaging portion 38 of the support bracket 31, positioned in front of the first engaging portion 25 in the vehicle, presses the arm portion 12a downward. Accordingly, when the movable panel 13 is fully closed, the arm portion 12a can be more stably pressed downward due to collaboration between the first engaging portion 25 and the second engaging portion 38 which are separated from each other in the longitudinal direction.

The embodiment may be changed in the following manner.

In the embodiment, the second engaging portion 38 of the support bracket 31 may be omitted.

In the embodiment, the number of ribs 26 formed in the first engaging portion 25 may be one, or three or more. The rib 26 may have the shape of a substantially triangular column with an acute apex facing downward. Alternatively, the rib 26 may have a substantially dome-like shape, or a substantially angled spindle or a substantially circular spindle with an acute apex facing downward.

In the embodiment, the ribs 26 of the first engaging portion 25 may be omitted.

In the embodiment, the driving shoe 21 may be disposed adjacent to a lateral inside portion of the arm portion 12a.

In the embodiment, insofar as it is possible to form the first engaging portion that presses the arm portion 12a downward, the driving shoe 21 may be disposed adjacent to the arm portion 12a in the lateral direction of the vehicle.

In the embodiment, a method for moving the driving shoe in association with the operation of the movable panel 13 is an example. For example, in the fully closed state of the movable panel 13, when the driving shoe moves toward the rear of the vehicle relative to the movable panel 13, the movable panel 13 may transition to the tilted up state, and in the tilted up state, when the driving shoe moves further toward the rear of the vehicle relative to the movable panel 13, the movable panel 13 may slide (be opened) along the guide rails 14 while being tilted upward.

In the embodiment, the movable panel 13 is tilted upward at two stages: the first tilted up state, and the second tilted up state in which the movable panel 13 is tilted further upward than the first tilted up state. In contrast, the position of the movable panel 13 in the original tilted up state, to which the movable panel 13 transitions from the fully closed state, may coincide with the position of the movable panel 13 in a tilted up state when the movable panel 13 slides along the guide rails 14.

In the embodiment, a connection mode for connecting the driving shoe 21 to the support bracket 31 (the movable panel 13) is illustrated as an example. For example, a guide groove may be concave in the support bracket 31 (the vertical wall portion 32) in the opposite direction to a direction in which the guide groove 22a is concave, and an elevating guide pin may be fixedly attached to the driving shoe 21, the elevating guide pin being engageably and movably inserted into the guide groove.

Subsequently, technical ideas which can be known from the embodiment and other examples are additionally described.

A sunroof apparatus according to an aspect of this disclosure includes: a movable panel that can open or close an opening formed in a roof of a vehicle; a deflector which is disposed along a front edge portion of the opening, and has arm portions that extend rearward from both end portions of the deflector in a lateral direction of the vehicle, and in which rear end portions of the arm portions are connected to the roof in such a manner that the deflector is turnable, and a biasing force is applied to the arm portions in a turning direction in which front ends pivotally move upward relative to the rear end portions; guide rails that are disposed in both end portions of the opening in the lateral direction of the vehicle, and extend in a longitudinal direction; driving shoes which are provided so as to be able to move along the guide rails in the longitudinal direction of the vehicle; and support brackets, front end portions of which are supported by the guide rails in such a manner that the support brackets can turn and move in the longitudinal direction of the vehicle, and which are connected to the driving shoes at a rear portion thereof in the longitudinal direction of the vehicle, and support the movable panel, in which along with the movement of the driving shoe in a fully closed state of the movable panel, when the support bracket turns in such a manner that a rear end of the support bracket pivotally moves upward relative to a front end portion of the support bracket, the movable panel is tilted upward, and subsequently, when the front end portion moves toward the rear of the vehicle, the movable panel slides along the guide rails while being tilted upward, and in which a first engaging portion is formed integrally with the driving shoe, and the first engaging portion presses the arm portion downward in a vertical direction of the vehicle in the fully closed state of the movable panel, and thereby holds the arm portion at a turning position in which the front end of the arm portion pivotally moves downward relative to the rear end portion because.

In this configuration, when the movable panel is in the fully closed state, the first engaging portion holds the arm portion at the turning position in which the front end of the arm portion pivotally moves downward relative to the rear end portion while counteracting the biasing force because the first engaging portion presses the arm portion downward in the vertical direction of the vehicle. When the support brackets and the driving shoes slide along the guide rails toward the rear of the vehicle such that the movable panel is opened, the first engaging portion releases the arm portions. At this time, the arm portion, biased by the biasing force, turns in such a manner that the front end of the arm portion pivotally moves upward relative to the rear end portion. Since the first engaging portion for controlling the position of the arm portion (the deflector) is formed integrally with the driving shoe, it is possible to reduce the number of components.

In the sunroof apparatus, it is preferable that, in the fully closed state of the movable panel, when the driving shoe moves toward the front of the vehicle relative to the support bracket, the movable panel transitions to a tilted up state, and in the tilted up state, when the driving shoe moves further toward the front of the vehicle relative to the support bracket, and then move toward the rear of the vehicle, the tilted up state is held due to engagement between the driving shoe and the support bracket.

In this configuration, when the movable panel transitions from the fully closed state to a tilted up state, the driving shoe moves toward the front of the vehicle relative to the support bracket. Accordingly, when the transition of the movable panel to the tilted up state is completed, the driving shoe is positioned relatively close to the front of the vehicle, and the first engaging portion of the driving shoe is disposed relatively separate from the turning axis (the rear end portion) of the arm portion. For this reason, the first engaging portion can more stably press the arm portion downward in the vertical direction of the vehicle. Since the first engaging portion can be disposed separate from the turning axis (the rear end portion) of the arm portion, it is possible to further reduce the required longitudinal dimension of the driving shoe including the first engaging portion.

In the sunroof apparatus, it is preferable that the driving shoe is disposed adjacent to the arm portion in the lateral direction of the vehicle.

In this configuration, it is possible to easily press the arm portion without considerably extending the first engaging portion in the lateral direction of the vehicle.

In the sunroof apparatus, it is preferable that a rib is formed in the first engaging portion in such a manner as to protrude downward in the vertical direction of the vehicle.

In this configuration, since the rib comes into point contact or line contact with the arm portion when the first engaging portion presses the arm portion downward in the vertical direction of the vehicle, a pressing force can be concentrated on the arm portion, and it is possible to prevent the occurrence of backlash of the arm portion.

In the sunroof apparatus, it is preferable that a second engaging portion is formed integrally with the support bracket, and the second engaging portion presses the arm portion downward in the vertical direction of the vehicle in the fully closed state of the movable panel at a position in front of the first engaging portion in the longitudinal direction of the vehicle, and thereby holds the arm portion at the turning position in which the front end of the arm portion pivotally moves downward relative to the rear end portion.

In this configuration, when the movable panel is fully closed, the driving shoe is positioned relatively close to the rear of the vehicle, and the first engaging portion of the driving shoe is disposed relatively close to the turning axis (the rear end portion) of the arm portion. For this reason, the first engaging portion may unstably press the arm portion downward in the vertical direction of the vehicle. However, the second engaging portion of the support bracket, positioned in front of the first engaging portion in the vehicle, presses the arm portion downward in the vertical direction of the vehicle. Accordingly, when the movable panel is fully closed, the arm portion can be more stably pressed downward due to collaboration between the first engaging portion and the second engaging portion which are separated from each other in the longitudinal direction of the vehicle.

In the sunroof apparatus, it is preferable that a second engaging portion is formed integrally with the support bracket, and the second engaging portion presses the arm portion downward in the vertical direction of the vehicle in the fully closed state of the movable panel at a position in front of the first engaging portion, and thereby holds the arm portion at the turning position in which the front end of the arm portion pivotally moves downward relative to the rear end portion.

In this configuration, when the movable panel is fully closed, the driving shoe is positioned relatively close to the rear of the vehicle, and the first engaging portion of the driving shoe is disposed relatively close to the turning axis (the rear end portion) of the arm portion. For this reason, the first engaging portion may unstably press the arm portion downward in the vertical direction of the vehicle. However, the second engaging portion of the support bracket, positioned in front of the first engaging portion in the vehicle, presses the arm portion downward in the vertical direction of the vehicle. Accordingly, when the movable panel is fully closed, the arm portion can be more stably pressed downward due to collaboration between the first engaging portion and the second engaging portion which are separated from each other in the longitudinal direction of the vehicle.

According to the aspect of this disclosure, it is possible to press the arm portions of the deflector without an increase in the number of components.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunroof apparatus comprising:
a movable panel that is configured to open or close an opening formed in a roof of a vehicle;
a deflector which is disposed along a front edge portion of the opening, and has arm portions that extend rearward from both end portions of the deflector in a lateral direction of the vehicle, and in which rear end portions of the arm portions are connected to the roof in such a manner that the deflector is turnable, and a biasing force is applied to the arm portions in a turning direction in which front ends pivotally move upward relative to the rear end portions;
guide rails that are disposed in both end portions of the opening in the lateral direction of the vehicle, and extend in a longitudinal direction;
driving shoes which are provided so as to be able to move along the guide rails in the longitudinal direction of the vehicle; and
support brackets, front end portions of which are supported by the guide rails in such a manner that the support brackets can turn and move in the longitudinal direction of the vehicle, and which are connected to the driving shoes at a rear portion thereof in the longitudinal direction of the vehicle, and support the movable panel, wherein
along with the movement of the driving shoe in a fully closed state of the movable panel, when the support bracket turns in such a manner that a rear end of the support bracket pivotally moves upward relative to a front end portion of the support bracket, the movable panel is tilted upward, and subsequently, when the front end portion moves toward the rear of the vehicle, the movable panel slides along the guide rails while being tilted upward, and
a first engaging portion is formed integrally with the driving shoe, and the first engaging portion presses the arm portion downward in a vertical direction of the vehicle in the fully closed state of the movable panel, and thereby holds the arm portion at a turning position in which the front end of the arm portion pivotally moves downward relative to the rear end portion.

2. The sunroof apparatus according to claim 1.
wherein in the fully closed state of the movable panel, when the driving shoe moves toward the front of the vehicle relative to the support bracket, the movable panel transitions to a tilted up state, and in the tilted up state, when the driving shoe moves further toward the front of the vehicle relative to the support bracket, and then moves toward the rear of the vehicle, the tilted up state is held due to engagement between the driving shoe and the support bracket.

3. The sunroof apparatus according to claim 1,
wherein the driving shoe is disposed adjacent to the arm portion in the lateral direction of the vehicle.

4. The sunroof apparatus according to claim 2,
wherein the driving shoe is disposed adjacent to the arm portion in the lateral direction of the vehicle.

5. The sunroof apparatus according to claim 1,
wherein a rib is formed in the first engaging portion in such a manner as to protrude downward in the vertical direction of the vehicle.

6. The sunroof apparatus according to claim 2,
wherein a rib is formed in the first engaging portion in such a manner as to protrude downward in the vertical direction of the vehicle.

7. The sunroof apparatus according to claim 3,
wherein a rib is formed in the first engaging portion in such a manner as to protrude downward in the vertical direction of the vehicle.

8. The sunroof apparatus according to claim 4,
wherein a rib is formed in the first engaging portion in such a manner as to protrude downward in the vertical direction of the vehicle.

9. The sunroof apparatus according to claim 1,
wherein a second engaging portion is formed integrally with the support bracket, and the second engaging portion presses the arm portion downward in the vertical direction of the vehicle in the fully closed state of the movable panel at a position in front of the first engaging portion in the longitudinal direction of the vehicle, and thereby holds the arm portion at a turning position in which the front end of the arm portion pivotally moves downward relative to the rear end portion.

* * * * *